United States Patent [19]

Gaunt et al.

[11] 4,147,232

[45] Apr. 3, 1979

[54] LUBRICANT APPLICATOR

[75] Inventors: Frank L. Gaunt, Puyallup; Horace E. Hill, Renton; Mark S. Soderberg, Kirkland, all of Wash.

[73] Assignee: Boeing Commercial Airplane Company, Seattle, Wash.

[21] Appl. No.: 777,247

[22] Filed: May 16, 1977

[51] Int. Cl.² ............................................. F01M 11/00
[52] U.S. Cl. .................................. 184/1 E; 184/102; 408/56; 407/11
[58] Field of Search ................. 184/102, 100, 16, 1 R, 184/1 E, 5, 14, 64; 408/56, 57, 18; 407/11; 83/169

[56] References Cited

U.S. PATENT DOCUMENTS

| | | | |
|---|---|---|---|
| 365,419 | 6/1887 | Welsh | 408/56 |
| 1,337,682 | 4/1920 | Woolson | 408/61 |
| 2,084,022 | 6/1937 | Frank | 408/8 |
| 2,418,646 | 4/1947 | Janson | 184/14 X |
| 2,437,605 | 3/1948 | Karge | 407/11 X |
| 2,956,455 | 10/1960 | Chaney | 408/56 |
| 3,113,337 | 12/1963 | Lyden | 184/16 |

*Primary Examiner*—David H. Brown
*Attorney, Agent, or Firm*—Bernard A. Donahue; Morris A. Case

[57] ABSTRACT

A lubricator for an automatic riveter positions an absorbent pad containing a liquid lubricant in the path of the riveter's drill bit when the bit is being moved laterally. The absorbent pad is resiliently held to ensure contact between the pad and the drill bit. When drilling only, the pad is mounted at an angle to a cylinder and is driven back and forth by the cylinder to contact the drill bit and transfer lubricant.

19 Claims, 5 Drawing Figures

LUBRICANT APPLICATOR

BACKGROUND OF THE INVENTION

Automatic riveters when in a full cycle operation drill a hole, retract the drill, move the drill and a rivet setter sideways, set the rivet, retract the rivet setter and move the drill and rivet setter sideways so that the drill is again in the work position and the cycle is repeated. When the automatic riveter is used in a drill-only cycle, the drill and riveter do not transfer laterally and the machine acts as a drill press. It is known to use a freon TB-1 spraying system to spray onto and cool the drill bit. This system is wasteful of freon, generates unpleasant fumes and if the supply lines become clogged or contaminated, the result may be out-of-tolerance holes, poor surface finish, unacceptable exit burrs, and reduced tool life or broken drills.

In a drill-only type of operation there are many known methods of lubricating the drill bit using a mechanical means to sequence the application of a lubricant. U.S. Pat. No. 1,337,682 and German Pat. No. 474,700 show the use of a dauber for use on a drill press, and U.S. Pat. No. 2,084,022 shows a dauber used to lubricate a tap on a tapping machine. It was found that a liquid applicator will lubricate an automatic riveter in full cycle or drill-only cycle.

SUMMARY OF THE INVENTION

A pad for receiving and transferring a lubricant upon contact with a boring tool is mounted to an actuating cylinder to be moved back and forth to contact a cutting member of the boring tool and return. The cylinder movement is automatically sequenced during the boring cycle.

It is an object of this invention to provide automatic lubrication to a cutting member of a boring tool.

It is another object of this invention to provide a lubricant applicator to lubricate a drill bit during full cycle automatic riveting.

It is yet another object of this invention to provide automatic lubrication to an automatic riveting machine during either a drill cycle or a full cycle operation.

DESCRIPTION OF THE DRAWINGS

FIG. 3 shows a fragmented perspective view of the drill being lubricated while in the drilling position.

DETAILED DESCRIPTION

Figure 1:
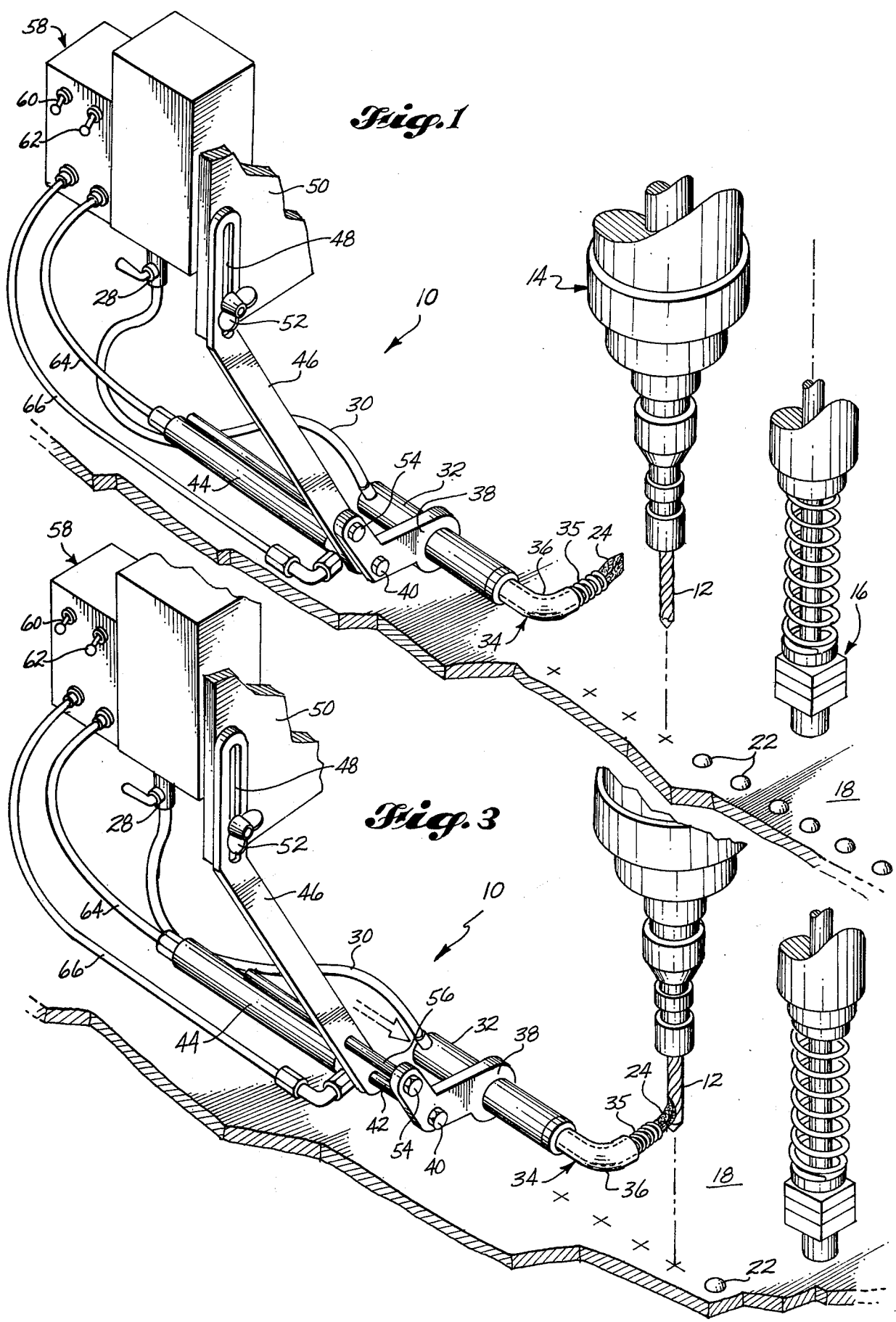
FIG. 1 shows a fragmented perspective view of this invention aligned to lubricate a drill bit of an automatic riveting machine.
Figure 2:
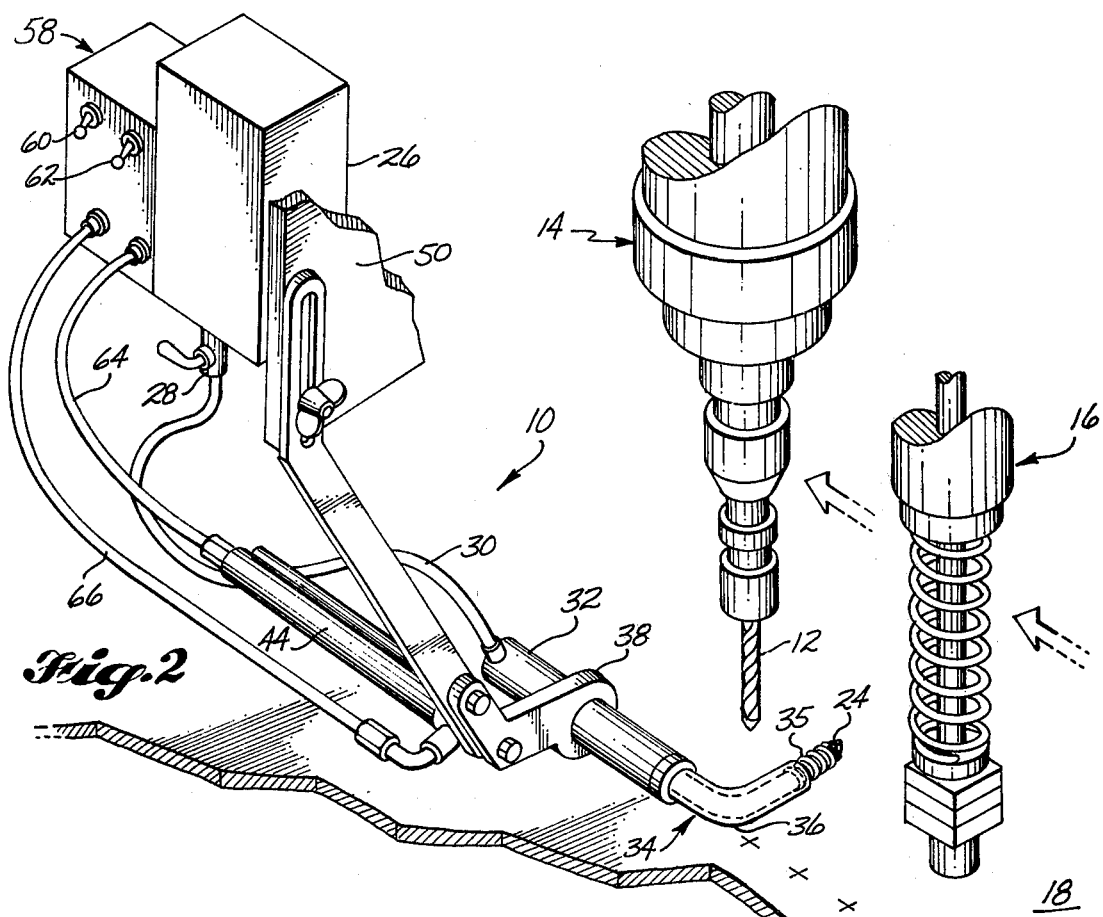
FIG. 2 shows a fragmented perspective view as in FIG. 1 wherein the drilling tool has been lubricated by moving laterally.

Lubricator 10 is set up to lubricate a drill bit 12 of drilling tool 14. The drilling tool is being used in conjunction with a rivet setting tool 16, both of which are part of an automatic riveter otherwise not shown. In FIG. 1 the drill is in working position ready to drill a hole through work piece 18. In FIG. 2 the drilling of hole 20 has been completed, the drill retracted, and the drill and rivet setting tool moved laterally to place the riveter in the work position to form fastened rivets 22. The lubricator has a wick or pad 24 of an absorbent material made from a material such as but not limited to cotton, wool, nylon or synthetic materials. The pad is located to extend into the path of the drill bit as it moves sideways. This pad containing a lubricant is flexed as the bit moves by and lubricant is deposited on the bit. When the drill bit is moving back to the work position, it again contacts and receives lubricant from the pad.

The lubricator 10 has a lubricant reservoir 26, feed valve 28, and feed line 30, which in turn connects to a hollow structural member 32. Leading out from the hollow member is a tube 34 into which the absorbent pad 24 may be inserted. However, it is preferable that a spiral wound spring 35 be inserted into the end of the tube and the absorbent pad extend through the spring into the tube and then into the hollow member.

The tube is preferably bent at 90 degrees at 36; so that the pad extends normal or perpendicular to the plane of travel of the laterally moving drill bit. Valve 28 is set to replenish the supply of lubricant at a rate depending upon the rate at which it is being removed by the drill bit. Any known lubricant may be used, however, it is preferable to use a lubricant of cetyl alcohol in 1,1,1, trichloroethane solvent. The hollow structural member is held by an arm 38; which in turn is fastened by nut 40 to an end of a cylinder or piston rod 42 of an actuating cylinder 44. The cylinder in turn is mounted to an adjustable support member 46 having a slot 48. The support member is held to part of the automatic riveter structure 50 by wing nut 52. With this arrangement the absorbent pad can be adjusted to preferably contact the cutting edges on the end of the drill bit, or it can be moved aside and held completely out of the way. The arm member 38 also fastens with nut 54 to a guide rod 56 which extends through the support member 46 to prevent rotation. When the riveter is in a full cycle operation, the wick is held in the position shown in FIGS. 1 and 2 and the drill bit moves laterally back and forth to be lubricated by contacting the positioned pad and the spring assists in returning the pad to the contact position.

Figure 5:
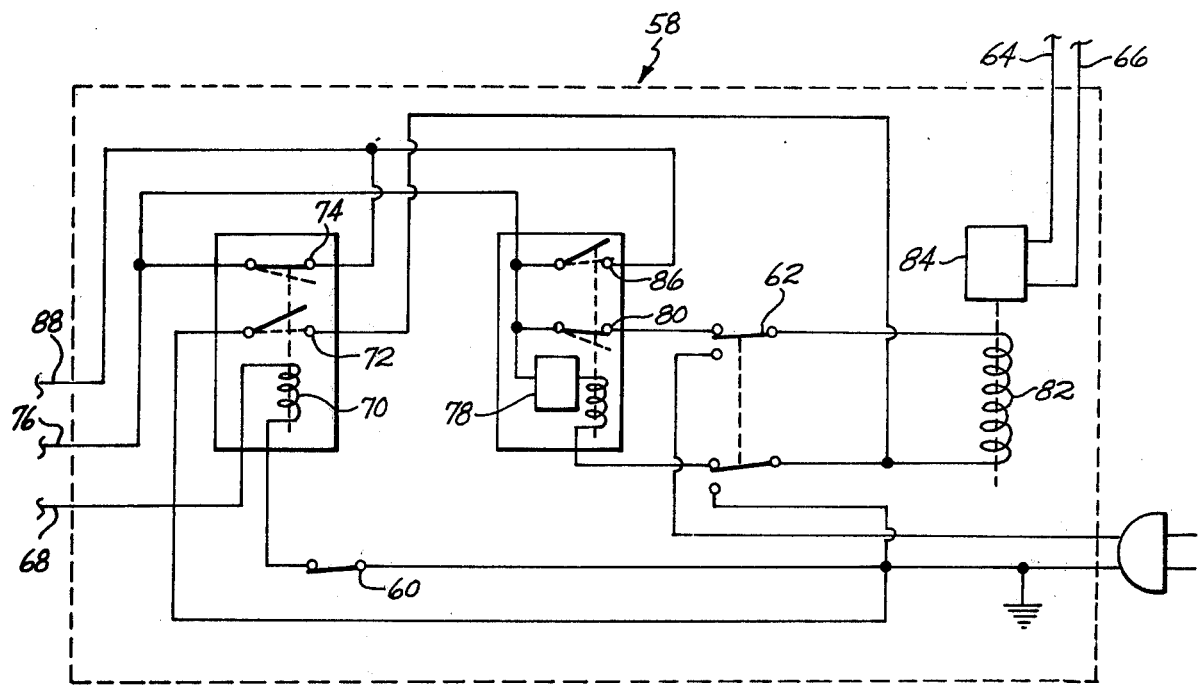
FIG. 5 shows a schematic of the control unit for sequencing the lubricator of this invention during a drilling operation.

FIG. 3 shows the lubricator 10 in operation with the riveter in the drill-only cycle and the pad 24 moved by the actuating cylinder 44 to contact the drill bit 12. Preferably the pad contacts the end of the drill bit and also is preferably cycled to pass by the drill bit before retracting to lubricate twice per actuating cycle. The actuating cylinder in this embodiment is powered with compressed air, but it is not designed to be limited to compressed air, as the cylinder may be hydraulic or be solenoid actuated. The cylinder is programmed to automatically lubricate the drill bit when the drill is in the retracted position. The lubricator has control box 58 with on-off switch 60 and test switch 62 and shows air feed lines 64 and 66 that lead to the actuating cylinder. FIG. 5 shows schematically the circuit portion of the control box as used to control lubrication during a drill-only cycle of an automatic riveter. This control box ties in with the automatic controls on the automatic riveter. The control box is activated when the automatic riveter has the drilling tool in the drill position and the lubricator is activated to move across and lubricate the drill when the automatic riveter signals to unclamp the work piece. Thus, when the drill 12 is in the drill position, a switch (not shown) on the riveter sends a signal through line 68 to activate relay coil 70 which closes switch 72 to provide a path for current flow to the lubricator and opens switch 74 to prevent premature unclamping of a work piece 18. When a switch on the automatic riveter is energized as ready to unclamp the work piece, a signal is sent over line 76 to time delay relay 78 and through switch 80 to the solenoid 82 of four-way valve 84. The four-way valve directs air through line 64 to energize actuating cylinder 44 and move the absorbent pad to contact and lubricate the drill bit 12. The time delay relay is set to be energized when the cylinder reaches the end of travel. When the time delay relay is energized, it opens switch 80 to deenergize solenoid 82, move the four-way valve and return the piston in the air cylinder to the starting position. At the same time switch 86 is closed, which sends a signal over line 88 to the automatic riveter to unclamp the work piece. The test switch 62, when activated directly, energizes solenoid 82 and actuates the lubricator. When the lubricator is to be used on a drill press or other boring tools, it is only necessary to utilize a limit switch having a time delay shut-off, with the limit switch to be activated to send a signal to the solenoid controlled four-way valve when the drill spindle is retracted.

Figure 4:
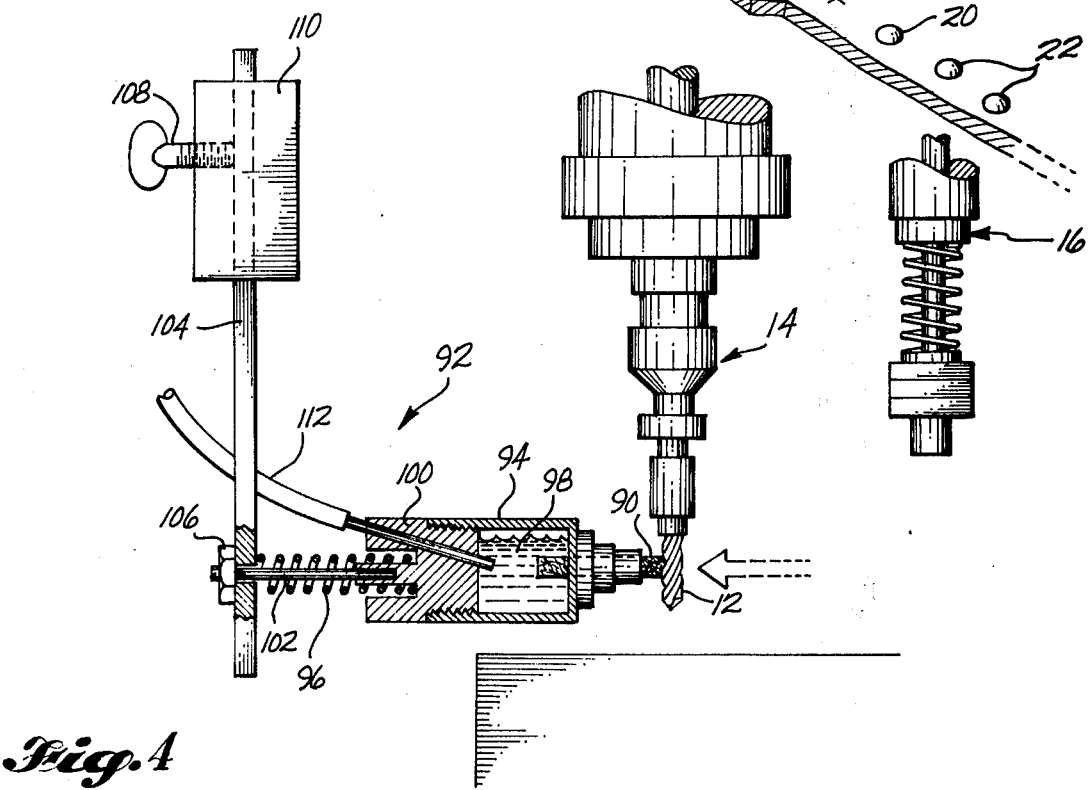
FIG. 4 shows a side elevational view of yet another embodiment of this invention with the lubricator partially in section.

FIG. 4 shows the drilling tool 14 and rivet setting tool 16 in an automatic riveting operation and near the end of sideways or lateral travel. The drill bit 12 has just contacted an absorbent felt pad 90 of a different embodiment of a lubricator 92. As the drill completes its lateral movement, it drives the housing 94 to which the pad is mounted backward against spring 96 to maintain contact with the pad and transfer lubricant 98 to the drill bit. The lubricant in the housing is contained by plug 100. A guide rod 102 is fastened to the plug, extends through support member 104, and is secured with nut 106. The guide rod is located to be in the line of travel of the lateral movement of the drilling tool, and bolt 108 adjustably secures the support member to riveter structure 110. The wicking action of the pad transfers the lubricant to the drill bit and line 112 is used to replenish the supply of lubricant from a reservoir not shown.

We claim:

1. An apparatus for providing lubricant to a boring tool comprising: an absorbent pad, means for continuously providing lubricant to the pad, and a cylinder actuation means for providing straight line reciprocating movement of the pad to contact and apply lubricant to a cutting member of a boring tool and to retract the pad away from the cutting member.

2. An apparatus for providing lubricant to a boring tool as in claim 1 wherein the pad extends laterally from the line of reciprocating movement to contact the cutting member during each direction of movement.

3. An apparatus as in claim 2 further comprising: a resilient member through which the pad extends.

4. An apparatus for providing lubricant to a boring tool comprising: a reservoir for a lubricant, an actuating cylinder, an absorbent pad mounted to be moved by the cylinder, means for providing communication between the reservoir and the pad to permit lubricant to be fed to the pad and means for cycling the cylinder to move the pad against and deposit lubricant on a cutting member of a boring tool and returning the pad to a starting position.

5. An apparatus for providing lubricant to a boring tool as in claim 4 wherein the absorbent pad extends laterally from a line of movement of the cylinder to contact and pass by the cutting member as the cylinder extends and to again contact the cutting member as the cylinder retracts.

6. An apparatus as in claim 5 further comprising a resilient member through which the pad extends to assist in returning the pad to original extended position.

7. An apparatus for providing lubricant to a boring tool as in claim 4 wherein the means for cycling the cylinder includes means for automatically cycling when the boring tool is in retracted position.

8. An apparatus for providing lubricant to a boring tool as in claim 7 wherein the absorbent pad extends laterally from a line of movement of the cylinder to contact and pass by the cutting member as the cylinder extends and to again contact the cutting member as the cylinder retracts.

9. An apparatus for automatically lubricating a drill bit in an automatic riveter with the apparatus comprising: an absorbent member in combination with a full cycle automatic riveter having means for moving a drilling tool and a rivet setting tool laterally as well as axially to sequence a drilling and riveting operation with said absorbent member containing a lubricant located to be contacted by and thereby transfer lubricant to a drill bit during lateral movement of the drill bit in the drilling tool of the automatic riveter, and means for replenishing lubricant removed from the absorbent member.

10. An apparatus for automatically lubricating a drill bit as in claim 9 further comprising the absorbent member to extend along a line of lateral movement of the drilling tool, and resilient means for allowing the absorbent member to be moved laterally by the drill bit near the end of the lateral travel of the drill bit.

11. An apparatus for automatically lubricating a drill bit as in claim 9 further comprising the absorbent member to extend along a line normal to a plane of travel of the laterally moving drill bit.

12. An apparatus as in claim 11 further comprising a resilient member through which the absorbent member extends.

13. An apparatus for automatically lubricating a drill bit in an automatic riveter having a drilling tool and a rivet setting tool programmed to move laterally as well as axially to sequence a drilling and riveting operation, the apparatus comprising: an absorbent member containing a lubricant located to be contacted by and thereby transfer lubricant to a drill bit during lateral movement of the drill bit located in a drilling tool of an automatic riveter, means for replenishing lubricant removed from the absorbent member, an actuating cylinder having a cylinder rod, the absorbent member mounted to the cylinder rod in a manner to extend along a line normal to a plane of travel of the laterally moving drill bit, and means for actuating the cylinder to reciprocally move the absorbent member.

14. An apparatus for automatically lubricating a drill bit in an automatic riveter, the apparatus comprising: an absorbent member containing a lubricant in combination with a full cycle automatic riveter having means for moving a drilling tool and a rivet setting tool laterally as well as axially to sequence a drilling and riveting operation with said absorbent member resiliently held in line to be contacted and moved laterally backward against the resilient member by the drill bit located in the drilling tool of the automatic riveter near an end of lateral travel of the drill bit to transfer lubricant onto the drill bit, and means for replenishing lubricant removed from the absorbent member.

15. An apparatus for automatically lubricating a drill bit in an automatic riveter having a drilling tool and a rivet setting tool programmed to move laterally as well as axially to sequence a drilling and riveting operation, the apparatus comprising: a cylinder to reciprocally move a piston rod; an absorbent pad containing a lubricant mounted to the piston rod, said pad resiliently held to extend at an angle from the rod to lie in a path of a lateral and reciprocal moving drill bit located in a drilling tool of an automatic riveter to transfer lubricant to the drill bit as it passes by, and means for replenishing lubricant removed from the absorbent pad.

16. An apparatus as in claim 15 further comprising means for energizing the cylinder to move the absorbent pad back and forth across the drill bit with the drilling tool in the retracted position.

17. A method of lubricating a drill bit of an automatic riveter which sequences a drilling and a riveting cycle with the drilling tool and the rivet setting tool moving laterally to allow positioning of the proper tool, the steps comprising: extending an absorbent pad from an end of a container, introducing a lubricant into the container, slidably mounting the container to a support structure, introducing a resilient member between the structure and the container, and positioning the container along the line of and near the end of lateral movement of a drilling tool.

18. A method of lubricating a drill bit of an automatic riveter which sequences a drilling and a riveting cycle with the drilling tool and the rivet setting tool moving laterally to allow positioning of the proper tool, the steps comprising: mounting an absorbent pad containing a lubricant to a piston rod of a cylinder, extending the pad at an angle from the line of travel of the piston rod, locating the absorbent pad into the line of travel of a laterally moving drill bit for transferring lubricant to the drill bit from the pad, and providing for replenishing the lubricant.

19. A method of lubricating a drill bit as in claim 18, steps further comprising: sequencing the piston rod to carry the absorbent pad back and forth across the drill bit when the automatic riveter is in a drill-only mode.

* * * * *